No. 731,483. PATENTED JUNE 23, 1903.
T. MATSON.
FLUID CONTROLLED FRICTION CLUTCH DEVICE.
APPLICATION FILED NOV. 17, 1902.
NO MODEL. 2 SHEETS—SHEET 1.

WITNESSES:

INVENTOR:
Taylor Matson
By his Attorney

No. 731,483. PATENTED JUNE 23, 1903.
T. MATSON.
FLUID CONTROLLED FRICTION CLUTCH DEVICE.
APPLICATION FILED NOV. 17, 1902.
NO MODEL. 2 SHEETS—SHEET 2.

WITNESSES: INVENTOR:
Taylor Matson
By his Attorney

No. 731,483. Patented June 23, 1903.

UNITED STATES PATENT OFFICE.

TAYLOR MATSON, OF PHILADELPHIA, PENNSYLVANIA.

FLUID-CONTROLLED FRICTION-CLUTCH DEVICE.

SPECIFICATION forming part of Letters Patent No. 731,483, dated June 23, 1903.

Application filed November 17, 1902. Serial No. 131,618. (No model.)

*To all whom it may concern:*

Be it known that I, TAYLOR MATSON, a citizen of the United States, residing in the city of Philadelphia, county of Philadelphia, and State of Pennsylvania, have invented certain new and useful Improvements in Fluid-Controlled Friction-Clutch Devices, of which the following is a specification.

This invention relates to certain new and useful improvements in fluid controlled friction clutch devices, and has for its object to provide an efficient construction, whereby a part to be driven may be quickly and effectively connected to a driving part.

As illustrated, the said device is employed for connecting the adjacent ends of two shafts which are in alinement, whereby the shafts may be caused to rotate in unison, but it is to be understood that the device is not to be restricted to this particular purpose, as it is useful for many purposes and in many relations not herein set forth.

The invention consists in the novel construction, combination, and arrangement of the parts hereinafter more particularly described.

Reference being had to the drawings.

In the drawings.

A designates a casing which comprises a wall 1 and an annular wall 2, the latter being formed integral with the said wall 1, and forming with the wall 1 a structure of cup-like contour.

Figure 2:
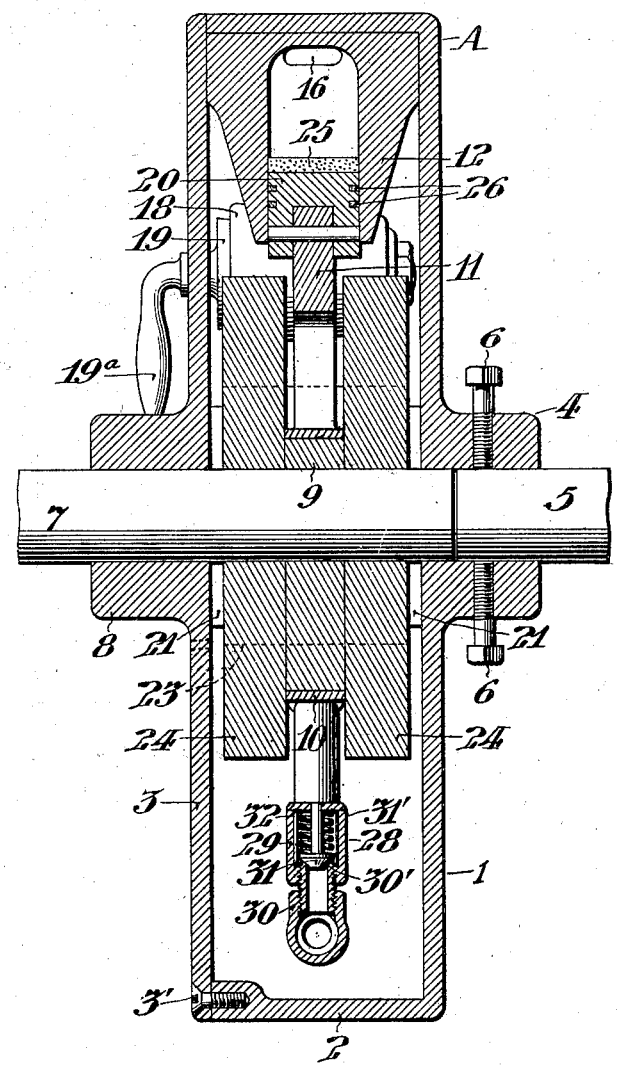
Figure 2 is a section on the line 2 2 of Figure 1.

3 designates a plate which is adapted to be fitted to the outer annular edge of the wall 2, and connected thereto as by screws 3' as shown in Figure 2.

The wall 1 is provided with a boss or hub 4, which has an opening therethrough, into which projects one end of a driven shaft 5. The said hub 4, and consequently the wall 1, are secured to the shaft 5 by means of set-screws 6, as clearly shown in Figure 2 of the drawings, and consequently rotate therewith when the same is rotated.

7 is a driving shaft which is in alinement with the shaft 5, and has one end located in proximity to one end of the said shaft 5 and within the casing A. The said shaft 7 passes loosely through a hub 8 upon the plate 3.

Rigidly secured upon the shaft 7, is an eccentric 9, and upon the latter an eccentric strap 10 is borne, which has an arm 11 secured thereto and extending radially therefrom for a purpose to be hereinafter stated.

Mounted upon the annular wall 2 of the casing A, are three hollow cylinders 12 having connection with a tubular and substantially circular passage way 13, which extends almost entirely around the inner side of the said annular wall 2.

The end 14 of the said passage way is adapted to be closed by a lifting valve 15, which admits air through the said end 14 into a region 16, and from thence the said air passes around the lifting valve 17 into the main portion of the said circular passage way.

The other end portion of the passage way 13 is provided with an enlargement 18 having an opening therethrough into which is fitted a rotary valve 19, by means of which the end 19' of the circular passage way is opened and closed.

As illustrated, said valve is rotated by means of the handle 19ª, but it is obvious that any other suitable means may be employed for this purpose.

20 is a piston which is adapted to be reciprocated in the cylinder 12 by reason of its connection with the radial arm 11 extending from the eccentric strap 10. Reciprocation of the said radial arm 11 is effected by the rotation of the eccentric 9. Such reciprocation of the piston draws the air or other fluid through the end 14 of the passage way 13 into the region 16, and forces it beyond the valve 17 into the main portion of the said passage way in a manner well understood.

Connected with the passage way 13 are cylinders 21 in which the pistons 22 are located. Connected to the inner ends of said pistons 22 are the brake shoes 23 which are adapted to bear upon the peripheral surfaces of the disks 24, which are rigidly secured to the shaft 7 and are concentric with respect thereto. There are two of these disks, one of which is located upon one side of the eccentric 9 and the other upon the opposite side of said eccentric. It is obvious, however, that this arrangement may be altered, if desired.

The cylinders 12 and 21 may be secured to the inner side of the annular wall 2 of the casing A by any suitable means, such as screws 21' as shown.

Figure 1:
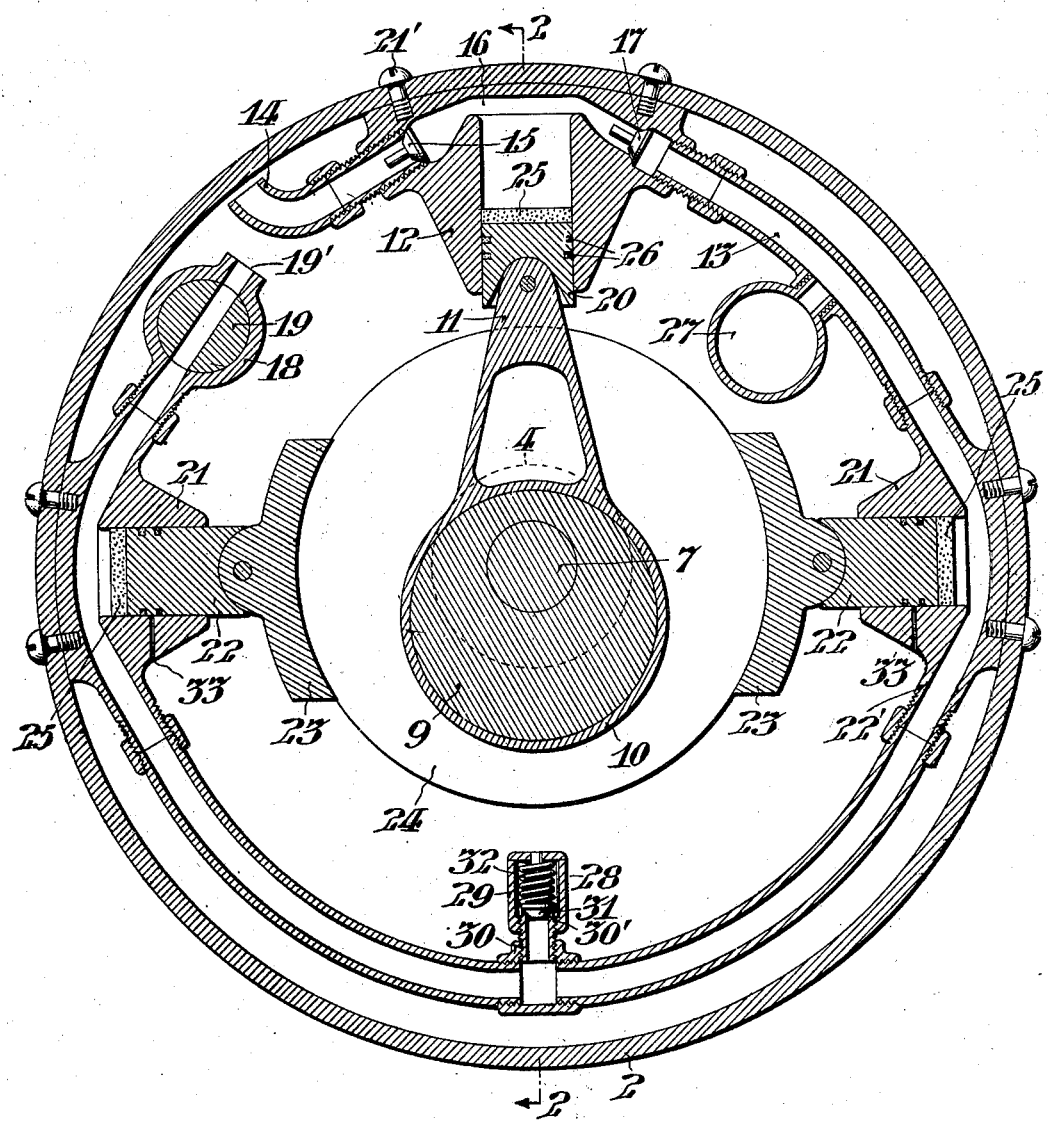
Figure 1 is a transverse section of a clutch embodying my invention.

The piston 20 and also the pistons 22 are constructed to fit closely within the cylinders through which they work, and are provided with suitable packing 25, located upon the outer ends of the said pistons. The said pistons 20 and 22 are also provided with packing rings 26, as clearly shown in Figure 1 of the drawings.

It will be noted that the said cylinders 12 and 21 are provided with ports 22' which constitute in part the passage way 13, previously referred to.

27 is a hollow receptacle or reservoir located within the casing A and having connection with, and being supported by, the tubular passage way 13. When the fluid is forced into the passage way 13, by means of the pumping action previously described, a portion of such fluid will enter into the hollow receptacle 27, and will compress the air with which said receptacle 27 is normally filled. If any of the fluid should escape from the passage way 13, the expansion of the compressed air in the receptacle 27 would force a portion of the fluid out of the said receptacle into the said passage way to compensate for the fluid which may have escaped.

It is obvious that some means should be employed to permit slippage of the casing A and its contained mechanism with respect to their associated parts in order to prevent breakage when the load or resistance to be overcome is greater than the casing, its contained mechanism or associated mechanism, is capable of sustaining.

The means employed for this purpose I designate a "safety device" which is shown at 28. It consists of a removable and adjustable cap 29 of cup-like contour, and which is in screw-threaded connection with a nipple 30, which is secured in an opening leading from the passage way 13. The nipple 30 is provided with a valve seat 30'. Located within the cap 29 is a lift valve 31 adapted to cooperate with the valve seat 30', the said valve being provided with a stem 31' which is guided in its reciprocatory movement by a small opening in the closed end of the cap 29.

Coiled about the valve stem is a wire spring 32 which normally holds the valve down upon the valve seat 30'. If the expansive pressure of the fluid within the passage way 13 becomes greater than the pressure of the spring, it is obvious that the valve will be raised and the pressure in the passage way thus maintained at a predetermined maximum. The maximum pressure in the fluid passage way 13 is determined by the pressure of the spring 32. The pressure of the said spring may be increased or diminished by adjusting the cap 29 or the same result may be secured by the substitution of a larger or a smaller spring for the one shown, that is, a spring of greater or less expansive power than the one shown. By determining the maximum pressure of the fluid in the passage way 13, and thus controlling the pressure of the brakes used upon the disks 24, the maximum load or resistance which the device may overcome will be determined.

It is obvious that the strength or compression power of this spring will determine the amount of the load or resistance which can be overcome by the device, and by this means the device and its connected parts need not be subjected to a strain greater than they are capable of withstanding.

I have provided openings 33 which extend through the walls of the cylinders 21. The object of these openings is to render the device inoperative when the shoes 23 have become worn too badly for further use.

It is evident that when these shoes have worn to such an extent that the outer ends of the plugs 22 are within the said openings 33, that is to say between the said openings and the peripheral surfaces of the disks 24, the device will not operate.

When the valve 19 is open, the device is rendered inoperative because the fluid which is forced through the passage way 13 by the action of the pumping piston 20 escapes through the open end 19' of the said passage way without effecting the clamping of the brake shoes 23 upon the disks 24, so that the shaft 5 is not rotated. Upon closure, however, of the said valve 19, the compression of the air or other fluid contained in the passage way 14 forces the brake shoes 23 inward and clamps them against the disks 24 which are secured to and rotate in unison with the driving shaft 7, whereby the shaft 5 is caused to assume a similar movement of rotation.

It will be understood that after closure of the valve 19, and when the shaft 5 has attained a speed of rotation equal to that of shaft 7, the pumping action ceases because the casing A which is mounted on the shaft 5 and the mechanism which is located within the said casing, and which is supported thereby, will have a movement in unison with the eccentric 9 and the disks 24, which are rigidly secured to the shaft 7. Relative movement between the shafts 5 and 7 is necessary to occasion reciprocation of the piston 20.

In the operation of the device, a fluid such as air, oil, or water is employed, and when either of the two last named fluids is employed, the contact between the said wall 3 and the annular edge of the wall 2 should be sufficiently close to prevent the passage of the same from the hollow casing.

If air is employed, it is obviously necessary to provide an opening or port, indicated by dotted lines in Figure 2, through the walls of the casing A to permit of the passage of air into the interior of said casing.

It will be noted that if oil is used in this device, as the operating fluid, the said device will be self-lubricating since by reason of its rotation the centrifugal force will cause the oil to assume a position in the outer annular portion of the casing A, as is obvious.

Having thus described my invention, I claim—

1. The combination of a casing, a hollow cylinder secured to said casing, an open-ended passage way within said casing and supported thereby and having connection with the said cylinder, means for closing the ends of said passage way, a piston operating in the cylinder, and an element with which said piston is adapted to coöperate, for the purpose set forth.

2. In a fluid pressure clutch device, the combination of a casing, said casing having an annular wall, an open-ended fluid passage way located within and supported upon the said annular wall, means for closing the ends of said passage way, hollow cylinders having connection with the said passage way, pistons operating in the said cylinders, and an element with which said pistons are adapted to coöperate, for the purpose set forth.

3. In a fluid pressure clutch device, the combination of a casing, said casing having an annular wall, an open ended fluid passage way located within and supported upon the said annular wall, the said passage way extending substantially around the sides of said wall, means for closing the ends of said passage way, hollow cylinders connected with the said passage way, pistons operating in said cylinders, an element with which said pistons are adapted to coöperate, and means for forcing a fluid into the said fluid passage way.

4. In combination, a casing having an annular wall, an open-ended substantially circular fluid passage way located within and supported upon said annular wall, means for closing the ends of said passage way, hollow cylinders supported upon said wall and having connection with the said fluid passage way, pistons operating in said cylinders, pumping mechanism for forcing air or other fluid into said passage way, means for opening and closing the ends of said passage way, and an element with which said pistons are adapted to coöperate, for the purpose set forth.

5. In combination, a casing having an annular wall, a fluid passage way located within and mounted upon said annular wall, hollow cylinders mounted upon said wall and having connection with the said fluid passage way, pistons mounted within said openings, an element with which said pistons are adapted to coöperate, pumping mechanism for forcing a fluid into said passage way and compressing it, means for opening and closing the ends of said passage way, and a hollow receptacle having connection with said passage way and adapted to contain air under compression, whereby leakage from the said passage way is compensated.

6. In a fluid pressure clutch device, the combination of a casing, an open ended fluid passage way located within said casing, means for permanently closing one of the ends of said passage way, means for forcing a fluid from the said casing into the other end of the passage way, and subjecting it to pressure within said passage way, and means for rendering the said clutch device effective as a driving mechanism, substantially as described.

7. In combination, a casing having an annular wall, an open ended fluid passage way located within and secured to said wall, means for closing the open ends of said passage way, hollow cylinders also secured to said wall and having connection with the said passage way, pistons located within said cylinders, a shaft, disks mounted upon said shaft, and brake shoes connected to the said pistons and adapted to coöperate with the peripheries of the said disks, for the purpose set forth.

8. In combination, a casing having an annular wall, an open ended fluid passage way located within and secured to said wall, means for closing the open ends of said passage way, hollow cylinders also secured to said wall and having connection with the said passage way, pistons located within said passage way, a shaft, disks mounted upon said shaft, brake shoes connected to the said plugs and adapted to coöperate with the peripheries of the said disks, an eccentric mounted upon the said shaft, a strap upon the said eccentric, the said strap having connection with a pumping piston, for the purpose set forth.

9. In combination, a casing, a fluid passage way located therein and supported thereupon, hollow cylinders also located within and supported upon said casing, and connecting with the said passage way, pistons located within the said openings, and means for rendering the device inoperative, said means comprising openings through the walls of said cylinders, whereby when the outer ends of the said pistons have moved inward beyond the inner end of the said openings, the fluid from the said passage way escapes into the casing.

10. The combination of a casing, hollow cylinders secured to said casing, an open ended passage way within said casing and supported thereby and having connection with the said cylinders, means for closing the ends of said passage way so that it is adapted to confine a fluid under pressure, pistons operating in the cylinders, and means associated with said passage way for limiting the pressure of the fluid, for the purpose set forth.

11. In a fluid pressure clutch device, the combination of a casing, said casing having an annular wall, an open ended fluid passage way located within and supported upon the said annular wall, means for closing the ends of said passage way so that it is adapted to confine a fluid under pressure therein, hollow cylinders having connection with the said passage way, pistons operating in the said cylinders, and means associated with said passage way for limiting the pressure of the fluid, for the purpose set forth.

12. In a fluid pressure clutch device, the combination of a casing, said casing having an annular wall, an open-ended fluid passage way located within and supported upon the said annular wall, the said passage way extending substantially around the side of said wall, means for closing the ends of said passage way, hollow cylinders connected with the said passage way, pistons operating in said cylinders, means for forcing the fluid into the said fluid passage way, and means associated with the latter to limit the pressure of the fluid, for the purpose set forth.

13. In a fluid pressure clutch device, the combination of a casing, a discontinuous fluid passage way located within said casing, means for permanently closing one of the ends of said passage way, means for forcing a fluid from the casing into the other end of the said passage way and subjecting it to pressure within said passage way, a shaft, and means associated with said passage way for receiving pressure from the said fluid, the said means operating to connect the clutch device and the shaft together, substantially as described.

14. In combination, a casing, a fluid passage way located within said casing, the opposite ends of which open into the said casing, hollow cylinders also located within said casing and having connection with the said passage way, pistons mounted within said cylinders, brake shoes connected to the said pistons, a shaft, disks mounted upon said shaft for coöperation with the said brake shoes, a safety device supported upon and carried by the said passage way, said device comprising a nipple extending from the said passage way, and a cap connected to said nipple, a valve located within said cap and adapted to close the outer end of said nipple, substantially as described.

15. In combination, a casing, a fluid passage way located therein, hollow cylinders also located within said casing and having connection with the said passage way, pistons located in said cylinders, means for taking a fluid from the space within the casing and from outside the said passage way and forcing it into the latter, means associated with the said passage way which is adapted to confine the said fluid under pressure therein, and means for determining the pressure of said fluid while in the passage way, substantially as described.

16. In combination, a casing, a fluid passage way located therein, hollow cylinders also located within said casing and having connection with the said passage way, pistons located in said cylinders, means for taking a fluid from the space within the casing and from outside the said passage way and forcing it into the latter, means associated with the said passage way which is adapted to confine the said fluid under pressure therein, means for determining the pressure of said fluid while in the passage way, said means comprising a nipple extending from said passage way, and a spring pressed valve seated within the inner end of said nipple, substantially as described.

In testimony that I claim the foregoing as my invention I have hereunto signed my name this 15th day of November, A. D. 1902.

TAYLOR MATSON.

In presence of—
S. SALOME BROOKE,
THOS. K. LANCASTER.